United States Patent [19]

Würminghausen et al.

[11] Patent Number: 4,720,530

[45] Date of Patent: Jan. 19, 1988

[54] RTV SILICONE PASTES WITH A SHORTENED HARDENING TIME

[75] Inventors: Thomas Würminghausen, Leverkusen; Hans Sattlegger, Odenthal, both of Fed. Rep. of Germany

[73] Assignee: Bayer Aktiengesellschaft, Leverkusen, Fed. Rep. of Germany

[21] Appl. No.: 880,622

[22] Filed: Jul. 1, 1986

[30] Foreign Application Priority Data

Jul. 9, 1985 [DE] Fed. Rep. of Germany ....... 3524452

[51] Int. Cl.$^4$ .............................................. C08G 77/06
[52] U.S. Cl. ........................................ 528/18; 528/12; 528/33; 528/34; 524/67; 524/424; 524/442; 524/445; 524/450; 524/449; 524/451; 524/588; 524/860
[58] Field of Search ....................... 528/34, 33, 18, 12; 524/860, 67, 424, 442, 445, 450, 449, 451, 588

[56] References Cited

U.S. PATENT DOCUMENTS

| | | | |
|---|---|---|---|
| 4,371,682 | 2/1983 | Hashimoto | 528/34 |
| 4,585,849 | 4/1986 | Saykowski et al. | 528/34 |

FOREIGN PATENT DOCUMENTS

| | | |
|---|---|---|
| 0050453 | 4/1982 | European Pat. Off. |
| 0138103 | 4/1985 | European Pat. Off. |
| 3143705 | 5/1983 | Fed. Rep. of Germany |
| 2026512 | 2/1980 | United Kingdom |
| 2059979 | 4/1981 | United Kingdom |

*Primary Examiner*—Melvyn I. Marquis
*Attorney, Agent, or Firm*—Sprung Horn Kramer & Woods

[57] ABSTRACT

Improved polyorganosiloxane compositions which can be stored with the exclusion of moisture and harden on access to moisture are disclosed. These compositions contain, 100 parts by weight of an $\alpha,\omega$-dihydroxypolydimethylsiloxane, 0 to 100 parts by weight of an $\alpha,\omega$-bis(trimethylsiloxy)polydimethylsiloxane plasticizer, 1 to 10 parts by weight of an oximinosilane, 5 to 250 parts by weight of a reinforcing or non-reinforcing filler or a filler mixture, 0.01 to 1 part by weight of a tin catalyst, 0.05 to 2.5 parts by weight of an aminoalkylalkoxysilane and 0.5 to 2.5 parts by weight of an accelerator chosen from alkyl or alkenyl carboxylic acids or silane derivatives of such carboxylic acids.

8 Claims, No Drawings

RTV SILICONE PASTES WITH A SHORTENED HARDENING TIME

The invention relates to one-component silicone pastes which harden in contact with atmospheric moisture, oximes being split off, adhere well to many substrates and have a short vulcanization time.

One of the known methods of preparing silicone pastes which harden under the influence of moisture is based on the use of oximinosilanes. Silanes of this type have been described in U.S. Pat. No. 3,289,576. α,ω-Dihydroxypolydimethylsilanes are mixed with the particular oximinosilane and, if appropriate, one or more fillers. Systems which can be stored with the exclusion of atmospheric moisture and harden under the influence of atmospheric moisture to give an elastomer, so called oxime systems, are obtained in this manner.

It has furthermore been disclosed that the crosslinking of oxime systems can be accelerated by metal catalysts, in particular dialkyl-tin dicarboxylates. The use of aminoalkylalkoxysilanes, for example

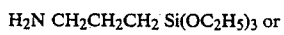

or

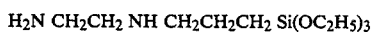

has also been described for application as a sealing material. Such silanes improve the adhesion to many substrates. Japanese Patent Application No. 46-11272 relates to systems which are prepared from α,ω-dihydroxypolydimethylsiloxanes, oximinosilanes, aminoalkylalkoxysilanes, tin catalysts and fillers.

The methods mentioned for the preparation of oxime systems which harden under the influence of moisture have disadvantages. This particularly applies if good adhesion to the substrate and, simultaneously, rapid vulcanization are required. Thus, although good adhesion is achieved without tin catalysts, the rate of vulcanization is usually only inadequate. Conversely, although the addition of tin catalysts leads to products which vulcanize rapidly, at the same time it causes losses in adhesion properties. This disadvantage can be compensated by aminoalkylalkoxysilanes, but these again have an adverse effect on the rate of crosslinking. Products produced in this manner do not always meet requirements in practice. They frequently harden too slowly at a low ambient temperature. There was therefore the object of discovering an oxime system which has a shorter hardening time and at the same time has good adhesion properties.

The present invention relates to polyorganosiloxane compositions which can be stored with exclusion of moisture and harden on access of moisture, comprising (1) 100 parts by weight of an α,ω-dihydroxypolydimethylsiloxane with a viscosity of between 0.1 and 1,000 Pas, (2) 0 to 100 parts by weight of an α,ω-bis(trimethylsiloxy)-polydimethylsiloxane with a viscosity of between 0.01 and 10 Pas, as a plasticizer, (3) 1 to 10 parts by weight of an oximinosilane of the composition

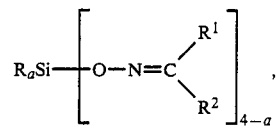

wherein
the symbols R are alkyl or alkenyl radicals with 1 to 4 C atoms,
$R^1$ and $R^2$ can each be an alkyl radical with 1 to 4 C atoms or hydrogen or
$R^1$ and $R^2$ together denote an alkylene radical with 4 to 5 C atoms,
and wherein
a can assume the value 0 or 1, (4) 5 to 250 parts by weight of a reinforcing or nonreinforcing filler or a filler mixture, (5) 0.01 to 1 part by weight of a tin catalyst and (6) 0.05 to 2.5 parts by weight of an aminoalkylalkoxysilane which contains one or more basic nitrogen atoms bonded with a silicon via C-atoms, preferably at least 3 C atoms, which are characterized in that 0.05 to 2.5 parts by weight of a vulcanization-accelerating auxiliary (7) chosen from the series comprising:

(a) alkyl or alkenylcarboxylic acids which have up to 20 C atoms and can optionally be substituted e.g. by a silane and (b) the silane derivative of such carboxylic acids with the composition

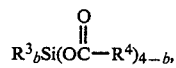

wherein
$R^3$ comprises alkyl or alkenyl radicals with up to 4 C atoms, substituted or unsubstituted,
$R^4$ is an alkyl or alkenyl radical with up to 20 C atoms and
b can assume the values 0 to 3,
is used.

Surprisingly, it has been found that the crosslinking of systems obtained from consituents (1) to (6) is accelerated by addition of a small amount of a carboxylic acid (7a). The same effect is achieved by adding compounds such as carboxylatosilanes (7b), from which carboxylic acids can be formed during the preparation of the pastes or in the course of crosslinking. The amounts of carboxylate necessary to achieve the vulcanization acceleration according to the invention are so small that the system has the properties of a neutral system unchanged.

Impairment of the adhesion properties is not associated with the accelerated crosslinking.

The polydimethylsiloxanes with hydroxyl or trimethylsiloxy end groups mentioned as constituents (1) and (2) are known and commercially available. Moreover, it should also be possible for the invention to be applied to polysiloxanes which, in addition to methyl radicals, also contain other substituents, for example phenyl groups. Also organic fillers, e.g. paraffines and/or isoparaffines may be used.

Suitable oximinosilanes (3) are compounds such as $CH_3Si[ON=C(C_2H_5)CH_3]_3$,
$CH_2=CHSi[ON=C(C_2H_5)CH_3]_3$, $CH_3Si[ON=C(CH_3)_2]_3$, $C_2H_5Si(ON=CHCH_3)_3$, $Si[ON=C(C_2H_5)_2]_4$ and

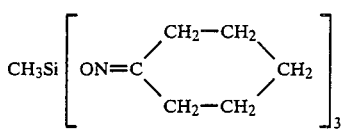

The substances and their preparation have been described in U.S. Pat. No. 3,189,576.

Possible fillers (4) are reinforcing fillers, such as pyrogenic and precipitated silicic acid, and non-reinforcing or low-reinforcing mineral materials such as carbonates (chalk and dolomite), silicates (clay, ground shale, mica, talc and wollastonite), $SiO_2$ (quartz and diatomaceous earth) and carbon black.

Suitable tin catalysts (5) are dialkyl-tin (IV) compounds, in particular dialkyl-tin (IV) dicarboxylates, for example dibutyl-tin dilaurate, dibutyl-tin diacetate, dioctyl-tin diacetate, dioctyl-tin maleate or dibutyl-tin di-2-ethylhexanoate. Other dialkyl-tin compounds, such as dialkyl-tin oxides or dialkyl-tin dialkoxides, can also be used, without any advantage resulting.

Suitable aminoalkylalkoxysilanes (6) are compounds such as $H_2NCH_2CH_2CH_2Si(OC_2H_5)_3$ and $H_2NCH_2CH_2NHCH_2CH_2CH_2Si(OCH_3)_3$, which are commercially obtainable. However, other aminoalkylalkoxysilanes can also be used to prepare the compositions according to the invention. A large number of such compounds have been described as adhesives or as crosslinking agents for silicone systems, and U.S. Pat. No. 3,888,815 can be mentioned as an example of this.

Carboxylic acids (7a) which can be used are all carboxylic acids which can be readily distributed in the silicone systems. Liquid or low-melting acids are therefore preferred. Examples are alkylcarboxylic acids with 1 to 20 C atoms, such as acetic acid, propionic acid, valeric acid, caprylic acid, myristic acid, pivalic acid and 2-ethyl-hexanoic acid. Acids such as the latter are preferred, above all because they cause no odour nuisance. Unsaturated acids, such as oleic acid or linolenic acid, also exert an accelerating influence on the vulcanization.

Carboxylatosilanes (7b) which can be employed are silanes such as $CH_3Si[OC(O)CH_3]_3$, $C_2H_5Si[OC(O)CH_3]_3$, $Si[OC(O)CH_3]_4$ or $CH_3Si[OC(O)CH(C_2H_5)C_4H_9]_3$. In addition to carboxylate radicals, the silanes can also carry other functional radicals, for example alkoxy radicals. However, this is of no relevance for functioning as an accelerating additive. Also compounds as

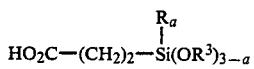

may be used.

The preparation of the compositions according to the invention does not require novel process steps. As is customary with silicone pastes which harden under the influence of moisture, the raw materials can be mixed in planetary mixers, butterfly mixers, dissolvers, continuously operating mixing screws or other apparatuses suitable for preparation of pastes. The products are introduced into closed vessels, for example cartridges.

Contact with atmospheric moisture should be avoided as far as possible during the preparation process.

The following examples are intended to illustrate the invention in more detail.

EXAMPLE 1

59 parts by weight of an α,ω-dihydroxypolydimethylsiloxane with a viscosity of 50 Pa.s and 22 parts by weight of an α,ω-bis(trimethylsiloxy)polydimethylsiloxane with a viscosity of 0.1 Pa.s were mixed with 5.7 parts by weight of $CH_3Si[ON=C(C_2H_5)CH_3]_3$ and with 7.5 parts by weight of pyrogenic silicic acid which had been rendered hydrophobic (BET surface area 110 m²/g), in a planetary mixer. Thereafter, 0.6 parts by weight of $H_2NCH_2CH_2CH_2Si(OC_2H_5)_3$, 0.3 parts by weight of dibutyl-tin dilaurate and 0.3 parts by weight of methyltriacetoxysilane were added.

To determine the rate of crosslinking, a sample of the paste was mixed with 1.2% of an emulsion of 58% of water in silicone oil and the Shore A hardness of this mixture as a function of time was determined. The time which the system containing the emulsion required, at 25° C., to reach a Shore A hardness of 5 was recorded as a measure of the rate of crosslinking. The present system according to the invention required 7 hours for this.

EXAMPLE 2

(Comparison)

The procedure was as in Example 1, but the $CH_3Si(OCOCH_3)_3$ (methyltriacetoxysilane) was omitted. In this case, the paste to which emulsion had been added required 23 hours to reach a Shore A hardness of 5.

Testing of the mechanical strength after hardening at 25° C. and 50% relative atmospheric humidity for 7 days gave the following values:

Hardness: Shore A hardness of 23
E modulus: 0.42 N/mm²
Tear strength: 1.4 N/mm²
Elongation at break: 460%.

The sealing material was applied in the form of cord-like bodies about 1 cm thick to glass, tile, aluminium, rigid PVC and polycarbonate plates. After hardening for 7 days, it was investigated whether the sealing material pulled off adhesively from the substrate. This was not the case with any of the substrates. A second series of comparable test plates were kept at room temperature under water for 1 week after the sealing material had hardened. After this exposure to water also, no adhesive pulling off was observed.

EXAMPLE 3

The batch described in Example 1 was repeated, but various carboxylic acids were used instead of the methyltriacetoxysilane. The carboxylic acids used and the amounts thereof employed are listed in Table 1. The time which the system requires, after mixing in 1.2% of the emulsion used in Example 1, to reach a Shore A hardness of 5 is again given as a measure of the rate of crosslinking. All the times are significantly shorter than in Comparison Example 2.

TABLE 1

| Carboxylic acid | Parts by weight of carboxylic acid on the recipe given in Example 1, without CH$_3$Si (OCOCH$_3$)$_3$ | Shore A hardness of 5 (hours) |
| --- | --- | --- |
| Linoleic acid | 0.58 | 7 |
| Cyclohexene-3-carboxylic acid | 0.26 | 13 |
| Ethoxyacetic acid | 0.22 | 7 |
| Formic acid | 0.10 | 13 |
| Dichloroacetic acid | 0.27 | 2 |
| Pivalic acid | 0.21 | 8 |
| 2-Ethylhexanoic acid | 0.30 | 7 |

EXAMPLE 4

The procedure was as in Example 1, but the methyltriacetoxysilane was replaced by 0.30 parts by weight of CH$_3$Si[OCOCH(C$_2$H$_5$)C$_4$H$_9$[$_3$. After hardening at 23° C. and 50% relative atmospheric humidity for 7 days, the following mechanical properties were found:

Hardness: Shore A hardness of 24
E modulus: 0.41 N/mm$^2$
Tear strength: 1.3 N/mm$^2$
Elongation at break: 430%.

The adhesion was tested as in Example 2. No adhesive pulling off was observed in any case, even after storage in water for 7 days.

After mixing with the emulsion of water in silicone oil, as in Example 2, the sealing material required 13 hours at 25° C. to reach a Shore A hardness of 5.

What is claimed is:

1. A polyorganosiloxane composition which can be stored with exclusion of moisture hardens on access of moisture, comprising (1) 100 parts by weight of an α,ω-dihydroxypolydimethylsiloxane with a viscosity of between 0.1 and 1,000 Pas, (2) 0 to 100 parts by weight of an α,ω-bis(trimethylsiloxy)-polydimethylsiloxane with a viscosity of between 0.01 and 10 Pas, (3) 1 to 10 parts by weight of an oximinosilane of the formula $$R_aSi\left[O-N=C\begin{matrix}R^1\\R^2\end{matrix}\right]_{4-a},$$

wherein
the symbol R is an alkyl or alkenyl radical with 1 to 4 C atoms,
R$^1$ and R$^2$ each independently of one another denote an alkyl radical with 1 to 4 C atoms or hydrogen or
R$^1$ and R$^2$ together denote an alkylene radical with 4 or 5 C atoms,
and wherein
a denotes 0 or 1, (4) 5 to 250 parts by weight of a reinforcing or non-reinforcing filler or a filler mixture, (5) 0.01 to 1 part by weight of a tin catalyst and (6) 0.05 to 2.5 parts by weight of an aminoalkylalkoxysilane which contains one or more basic nitrogen atoms bonded with the silicone via at least 3 C atoms, and (7) 0.05 to 2.5 parts by weight of an additive which accelerates crosslinking selected from the group consisting of (a) unsubstituted or substituted alkyl or alkenylcarboxylic acids which have up to 20 C atoms and (b) the silane derivatives of such carboxylic acids with the composition $$R^3{}_bSi(O\overset{O}{\overset{\|}{C}}-R^4)_{4-b},$$

wherein
R$^3$ denotes an alkyl or alkenyl radical with up to 4 C atoms,
R$^4$ denotes an unsubstituted or substituted alkyl or alkenyl radical which have up to 20 C atoms,
b can assume the values 0 to 3.

2. A composition according to claim 1, wherein the oximinosilane is CH$_3$Si[ON=C(C$_2$H$_5$)CH$_3$]$_3$.

3. A composition according to claim 2, wherein the aminoalkylalkoxysilane is H$_2$NCH$_2$CH$_2$CH$_2$Si(OC$_2$H$_5$)$_3$ or H$_2$NCH$_2$CH$_2$CH$_2$Si(OCH$_3$)$_3$.

4. A composition according to claim 2, wherein the aminoalkylalkoxysilane is H$_2$NCH$_2$CH$_2$NHCH$_2$CH$_2$CH$_2$Si(OCH$_3$)$_3$.

5. A composition according to claim 3, wherein the additive which accelerates crosslinking is 2-ethylhexanoic acid.

6. A composition according to claim 3, wherein the additive which accelerates crosslinking is $$CH_3Si\left[\underset{O}{\overset{}{O}}\overset{}{C}-CH(C_2H_5)\ C_4H_9\right]_3$$

7. A composition according to claim 4, wherein the additive which accelerates crosslinking is 2-ethylhexanoic acid.

8. A composition according to claim 4, wherein the additive which accelerates crosslinking is $$CH_3Si\left[\underset{O}{\overset{}{O}}\overset{}{C}-CH(C_2H_5)\ C_4H_9\right]_3$$

* * * * *